United States Patent [19]
Ho et al.

[11] Patent Number: 4,519,423
[45] Date of Patent: May 28, 1985

[54] MIXING APPARATUS USING A NONCIRCULAR JET OF SMALL ASPECT RATIO

[75] Inventors: Chih-Ming Ho, Rancho Palos Verdes; Ephraim Gutmark, Arcadia, both of Calif.

[73] Assignee: University of Southern California, Los Angeles, Calif.

[21] Appl. No.: 512,291

[22] Filed: Jul. 8, 1983

[51] Int. Cl.[3] .............................................. F16K 19/00

[52] U.S. Cl. .................................. 137/888; 137/889; 137/896; 366/167; 366/173; 366/174; 366/178; 417/196; 417/198

[58] Field of Search ................................ 137/888-894, 137/896-898; 417/196, 198; 366/167, 173, 338, 174, 178

[56] References Cited

U.S. PATENT DOCUMENTS

| | | | |
|---|---|---|---|
| 465,590 | 12/1891 | Burke | 417/198 |
| 973,914 | 10/1910 | Caffery | 137/898 |
| 1,119,515 | 12/1914 | Josse et al. . | |
| 2,007,029 | 7/1935 | Uhri . | |
| 2,325,242 | 7/1943 | Gordon | 137/893 X |
| 2,361,150 | 10/1944 | Petroe | 137/888 X |
| 3,137,131 | 6/1964 | Tyler et al. . | |
| 3,201,049 | 8/1965 | Hayes | 137/889 X |
| 3,238,021 | 3/1966 | Webber | 366/173 X |
| 3,322,151 | 5/1967 | Giese | 137/888 X |
| 3,570,766 | 3/1971 | Johnson . | |
| 3,886,973 | 6/1975 | Kinney | 137/896 |
| 3,918,491 | 11/1975 | Weltmer | 137/896 |
| 3,972,479 | 8/1976 | Calabrese . | |
| 4,114,195 | 9/1978 | Dirksing | 366/167 |

OTHER PUBLICATIONS

Dhanak and DeBernardinis, *J. Fluid Mech.*, 109, 189 (1981).

Ho and Hsiao, "Evolution of Coherent Structures in a Lip Jet", Conference on Structure of Complex Flow, Marseille (1982), Ho and Huang, *J. Fluid Mech.*, 119, 443 (1982).

*Primary Examiner*—Robert G. Nilson
*Attorney, Agent, or Firm*—Nilsson, Robbins, Dalgarn, Berliner, Carson & Wurst

[57] ABSTRACT

An apparatus for mixing fluids includes at least one noncircular orifice having unequal major and minor axis dimensions, with the major axis dimension being less than approximately 5 times the minor axis dimension. A first fluid is emitted from the orifice as a jet for mixing with another fluid in a region downstream of the orifice. The mixing region extends downstream a distance at least equal to the minor axis dimension, and then either terminates in a wall in the path of the jet or continues downstream to a total distance of at least approximately 3 times the minor axis dimension. The mixing region has a lateral width of at least 2(a+0.4x) in a direction parallel to the major axis and a lateral width of at least 2(b+0.4x) in a direction parallel to the minor axis, where a and b are one-half the major and minor axis dimensions, respectively, and x is the distance downstream of the orifice.

23 Claims, 20 Drawing Figures

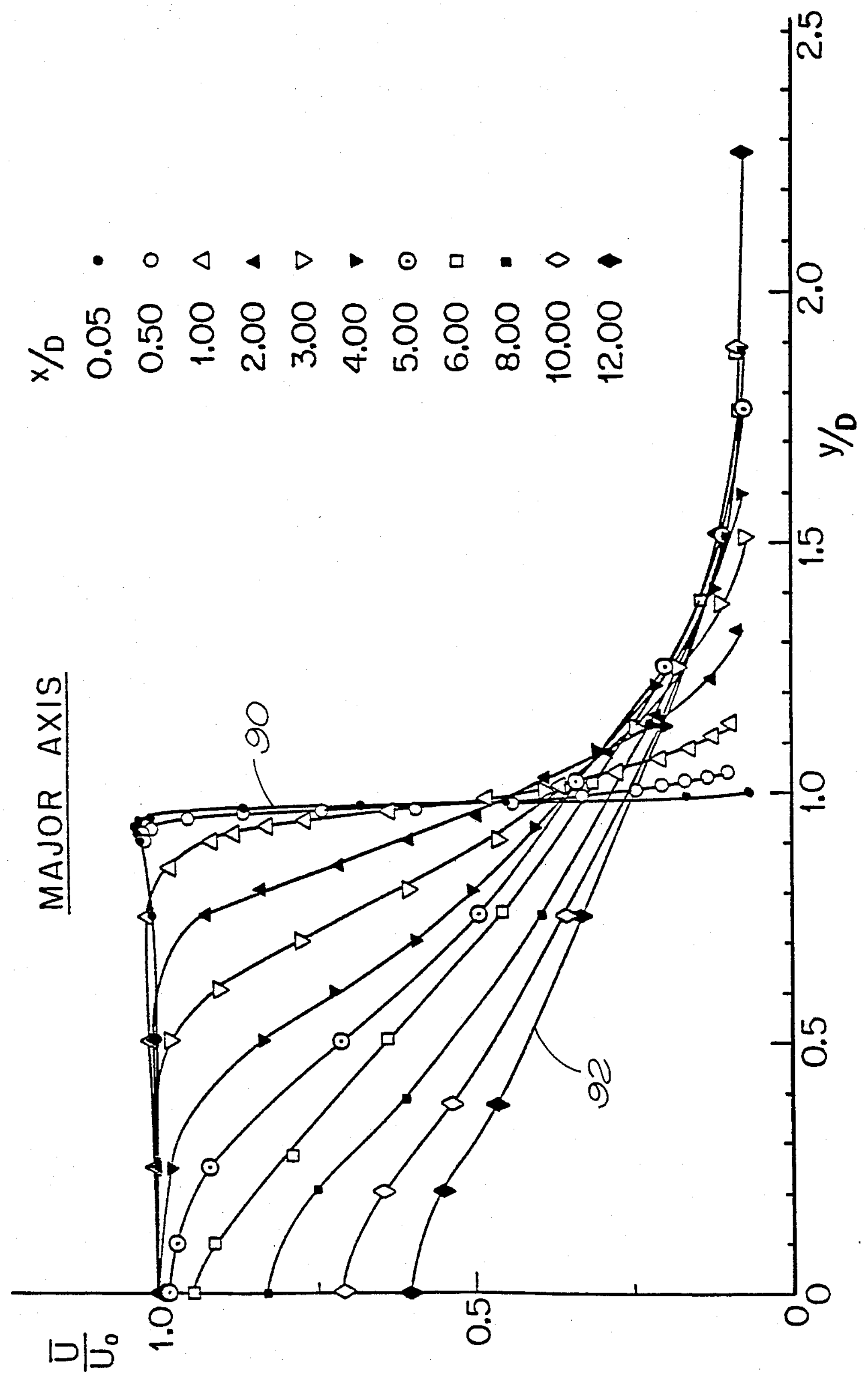
FIG. 7A: MEAN AXIAL VELOCITY PROFILES ON THE MAJOR AXIS PLANE.

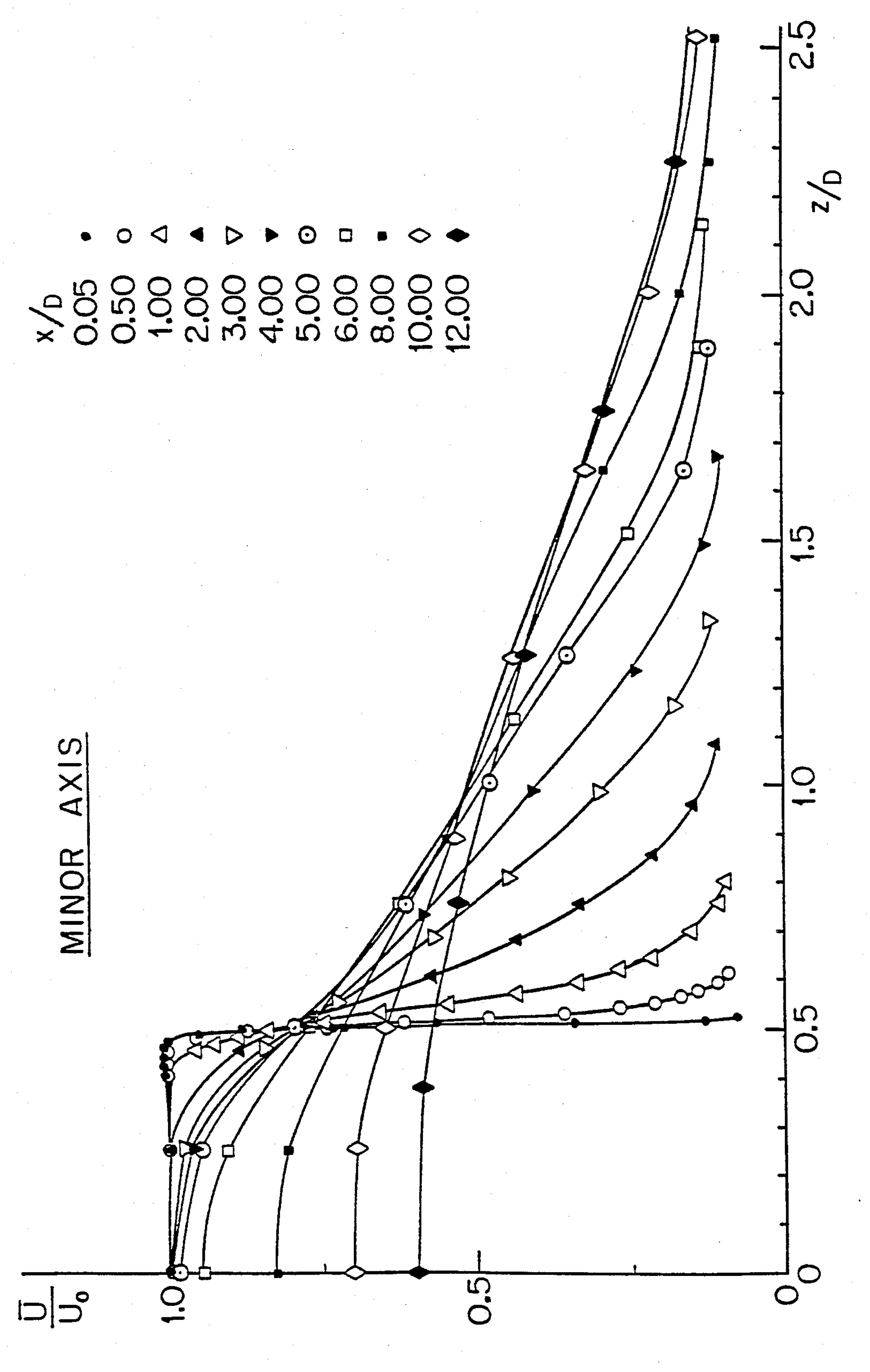
FIG. 7B *MEAN AXIAL VELOCITY PROFILES ON THE MINOR AXIS PLANE.*

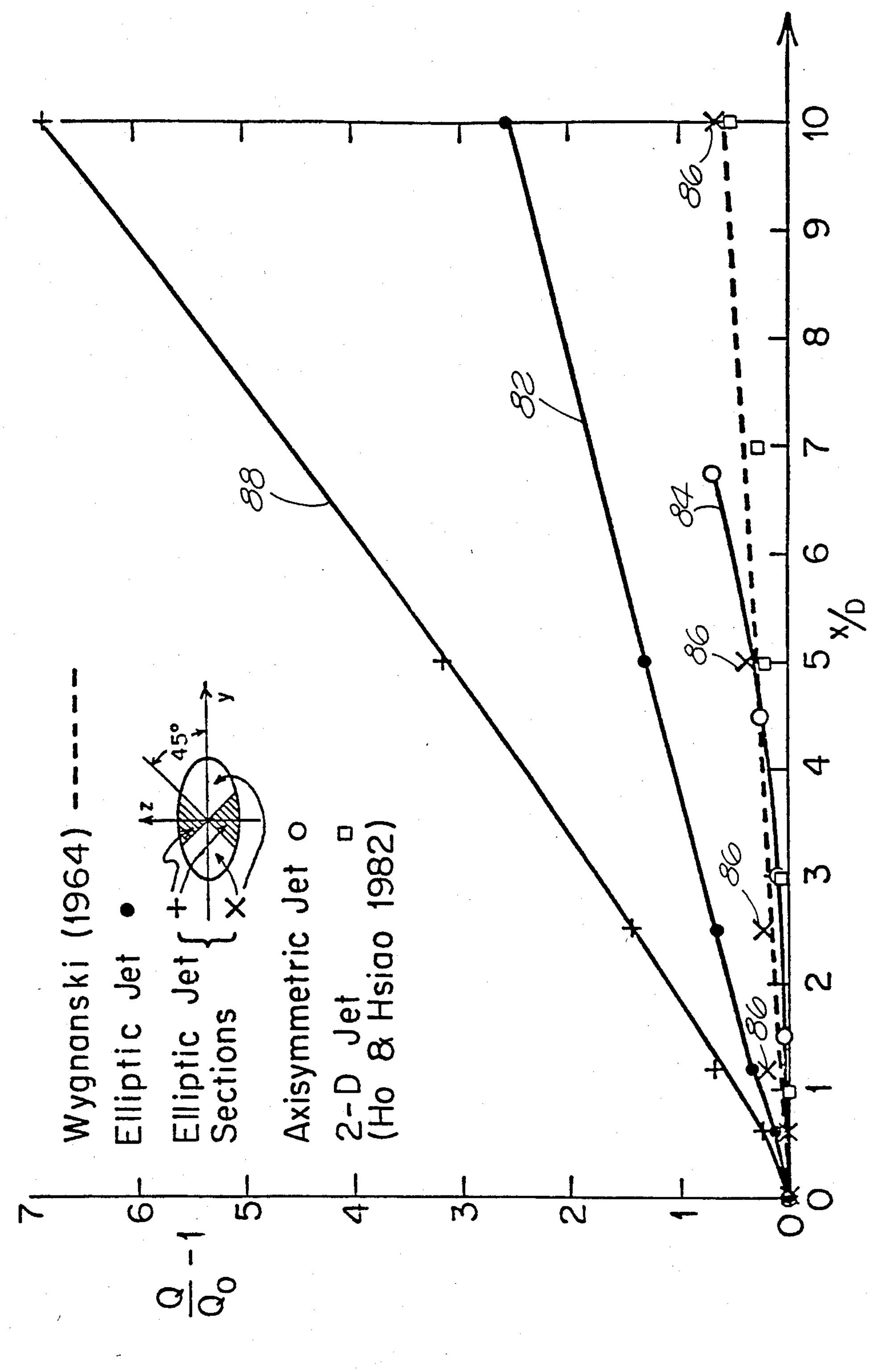
FIG. 8: A COMPARISON OF THE ELLIPTIC JET MASS ENTRAINMENT TO THAT ACHIEVED WITH CIRCULAR AND PLANAR JETS.

MIXING APPARATUS USING A NONCIRCULAR JET OF SMALL ASPECT RATIO

This invention was made with Government support under Contract Number F49620-82-K-0019 awarded by the Office of Scientific Research of the U.S. Air Force. The U.S. Government has certain rights to this invention.

BACKGROUND OF THE INVENTION

The present invention relates generally to an improved apparatus for mixing fluids and, more particularly, to a mixing apparatus using a noncircular jet of small aspect ratio.

In a wide variety of applications, it is desirable to mix two fluids of the same phase within a relatively small distance. Such applications include, for example, combustion processes, chemical reactions, heat transfer processes, laser technology, environmental control systems and sprayers.

In the past, fluid mixing has often involved bringing a circular jet of one fluid into contact with a second fluid of the same phase. Mixing is accomplished by spreading of the jet. A naturally unstable flow condition at the boundary of the jet forms a vortex which causes the jet to spread and entrain the second fluid. The vortex increases rather slowly in size in the downstream direction and defines a uniform shear layer around the potential core of the jet.

Another form of turbulent jet which has been used and studied in the past is a two-dimensional or "planar" jet which is long and narrow enough in cross section that its end effects are negligible. When the "major axis" of a jet is defined as the direction of its maximum lateral dimension, and the "minor axis" is perpendicular to the major axis, the planar jets of the prior art have a major axis dimension at least five times as great as the minor axis dimension. In some cases, the major axis dimension may be as great as 20 or 40 times the minor axis dimension. Such two-dimensional jets produce a uniform shear layer similar in concept to the shear layer of a circular jet, and tend to grow rather slowly in the downstream direction. This limits entrainment of the second fluid.

Circular and two-dimensional jets have been studied, as described in Wygnanski, I., *AERO. QUART.* 15, 373 (1964), and Ho and Hsiao, 1982 *Proceedings of IUTAM Symposium on Structure of Complex Flow,* Marseille, France, Springer-Verlag. The results of such studies are depicted in FIG. 8, where the curve 84 and the dashed line represent entrainment achieved with an axisymmetric (i.e., circular) jet, and the square markings represent entrainment achieved with two-dimensional jets. The two-dimensional jet used by Ho and Hsiao in obtaining these results had an aspect ratio (i.e., ratio of the major axis dimension to the minor axis dimension) of 24 to 1. As shown in FIG. 8, the mass entrainment achieved with two-dimensional jets is approximately the same as that achieved with simple axisymmetric jets.

Attempts have been made to enhance fluid mixing by distorting the edge of an axisymmetric orifice from which a jet is emitted. For this purpose, portions of the edge are bent alternately in and out to form a series of tabs which generate small disturbances or perturbations in the flow. The disturbances give rise to small eddies and enhanced mixing. However, the enhancement achieved in this way has been limited to between 5 and 15 percent.

Another known method of enhancing fluid mixing is to externally "force" a fluid flow, as described in *J. Fluid Mech.,* 119, 443 (1982). In the context of a jet, external forcing involves pulsation of the velocity or pressure of the jet to increase entrainment. For example, a sinusoidal pressure variation can be applied to the jet for this purpose. Although external forcing increases mixing efficiency, it also consumes external energy and is inappropriate in a large number of applications.

Elliptic vortex rings have been studied in contexts other than fluid mixing, as discussed in Dhanak and De Bernardinis, *J. Fluid Mech.,* 109, 189 (1981). Vortex rings are transitory flows in the nature of "puffs", and have little in common with fluid jets of the type used in mixing. Whereas a jet is a constant flow of fluid, there is no mean flow in a vortex ring. Vortex rings have been studied recently as an aid in understanding the nature of vortices generated at the tips of airplane wings. In the course of such studies, it was found that elliptical vortex rings undergo repeated transitions after they are formed, by which the major and minor axes of the rings switch back and forth. To the best of applicant's knowledge, this phenomenon, known as "vortex induction", has not been considered applicable in any way to fluid mixing, nor has it been suggested that the phenomenon would occur under constant flow conditions.

Finally, nonaxisymmetric jets of small aspect ratio are discussed in Hayes U.S. Pat. No. 3,201,049, in connection with an aspirating garden hose sprayer for applying liquid chemicals to plants. A primary fluid, water, is introduced to an aspirating chamber through an inlet passage which may be square, rectangular or triangular in cross section. The specification teaches that the inlet passage should have at least two straight sides for maximizing turbulence within the chamber. However, the geometry of the aspirating chamber and subsequent passages are such that the jet emitted by the inlet passage is confined in the lateral direction once it travels a short distance from the inlet passage. In the embodiment of FIG. 1, the downstream end of the inlet passage also diverges at an acute angle which would cause separation of the flow from the orifice wall. Thus, the Hayes device is designed to accurately proportion a relatively small amount of a liquid chemical into a water stream, but is not suited to entraining large quantities of the liquid at high efficiency.

Therefore, it is desirable in many applications to provide an apparatus for efficiently mixing two fluids in a relatively short distance and without the need for external energy.

SUMMARY OF THE INVENTION

The present invention comprises an apparatus for mixing fluids, comprising: first fluid conductive means terminating in at least one noncircular orifice for emitting a jet of a first fluid along a path in a preselected direction, the orifice having unequal major and minor axis dimensions with the major axis dimension being less than approximately five times the minor axis dimension; means for providing a second fluid at a location downstream of the orifice for mixing with the first fluid; and means defining a mixing region which extends downstream of the orifice a distance at least equal to the minor axis dimension, and which either terminates in a wall in the path of the jet or continues downstream to a total distance from the orifice of at least approximately three times the minor axis dimension; the mixing region having a lateral width of at least 2(a+0.4x) in a direction parallel to the major axis and a lateral width of at least 2(b+0.4x) in a direction parallel to the minor axis, where a and b are one-half the major and minor axis dimensions, respectively, and x is the distance downstream of the orifice.

In a preferred embodiment, the orifice does not diverge from the preselected direction of the jet by an acute angle of more than approximately 7 degrees, and the orifice is elliptic in shape. In a further embodiment, the major axis dimension of the orifice is between two and three times the minor axis dimension, and the mixing region has a lateral width of at least 2(a+0.6x) in a direction parallel to the major axis and a lateral width of at least 2(b+0.6x) in a direction parallel to the minor axis.

The apparatus of the present invention employs a noncircular orifice to generate a jet of noncircular cross section and relatively low aspect ratio. The major axis dimension of the jet is initially greater than its minor axis dimension, but by less than a factor of five. Under these conditions, it has been found that the jet undergoes a "vortex induction" similar to the induction phenomenon encountered in vortex rings. The process involves evolution of the jet from an initial eccentric condition, through an intermediate condition, and to a different eccentric condition in which the major and minor axes of the original shape have been switched. The process repeats itself as the fluid passes further downstream, and acts as a passively generated disturbance which drastically increases entrainment and mixing with a surrounding fluid. In other words, the shear layers are asymmetric and change constantly as the flow proceeds downstream, producing a turbulent effect. At the same time, the shear layers progress radially inwardly toward the potential core of the jet, accelerating the point at which they merge to eliminate the potential core. Thus, the phenomena of vortex induction and vortex merging work together in the apparatus of the present invention to enhance entrainment. As described above, the phenomenon of vortex induction has heretofore been thought to apply only to individual, transitory vortex rings, such as smoke rings, and not to a constant flow device.

In utilizing the concepts of vortex induction and vortex merging to enhance mixing it is necessary to provide a suitable mixing environment downstream of the orifice. The jet emitted by the orifice must be given adequate space to undergo induction, spreading and eventually merging, if it is to adequately mix with a secondary fluid. Applicants have defined the required mixing region as having predefined lateral widths in directions parallel to the major and minor axes, respectively, of the orifice. These widths are expressed as linear functions of the distance downstream from the orifice, providing an ever-increasing cross-sectional area in the downstream direction. The mixing region either terminates in a wall in the path of the jet, at a distance downstream of the orifice at least equal to the minor axis dimension, or continues downstream to a distance at least approximately three times the minor axis dimension. In the prior case, the jet impinges on the wall in the manner of conventional impinging jets, while in the latter case the flow is allowed to proceed downstream and mix primarily by spreading. Although the two cases appear dissimilar on the surface, the principles involved are analogous. In both cases, the nonuniform shear layer of the jet acts to promote spreading and mixing with a secondary fluid.

It is also desirable in the present invention that the orifice not diverge from the preselected direction at an acute angle which will cause separation of the jet flow from the orifice wall, since such flow separation disrupts the downstream induction of the vortex. Thus, in a preferred embodiment the orifice does not diverge at an acute angle of more than approximately seven (7) degrees. In fact, it is contemplated that the orifice often will not diverge at all, but rather will have either parallel sides or a slightly converging configuration.

BRIEF DESCRIPTION OF THE DRAWINGS

The above and other features of the present invention may be more fully understood from the following detailed description taken together with the accompanying drawings, wherein similar reference characters refer to similar elements throughout and in which:

FIGS. 7A and 7B are mean axial velocity profiles along the major and minor axis planes, respectively, of the jet;

FIG. 8 is a graphical comparison of the mass entrainment achieved with the elliptic jet of the present invention, to that achieved with circular and planar jets.

DESCRIPTION OF THE PREFERRED EMBODIMENTS

Figure 1B:
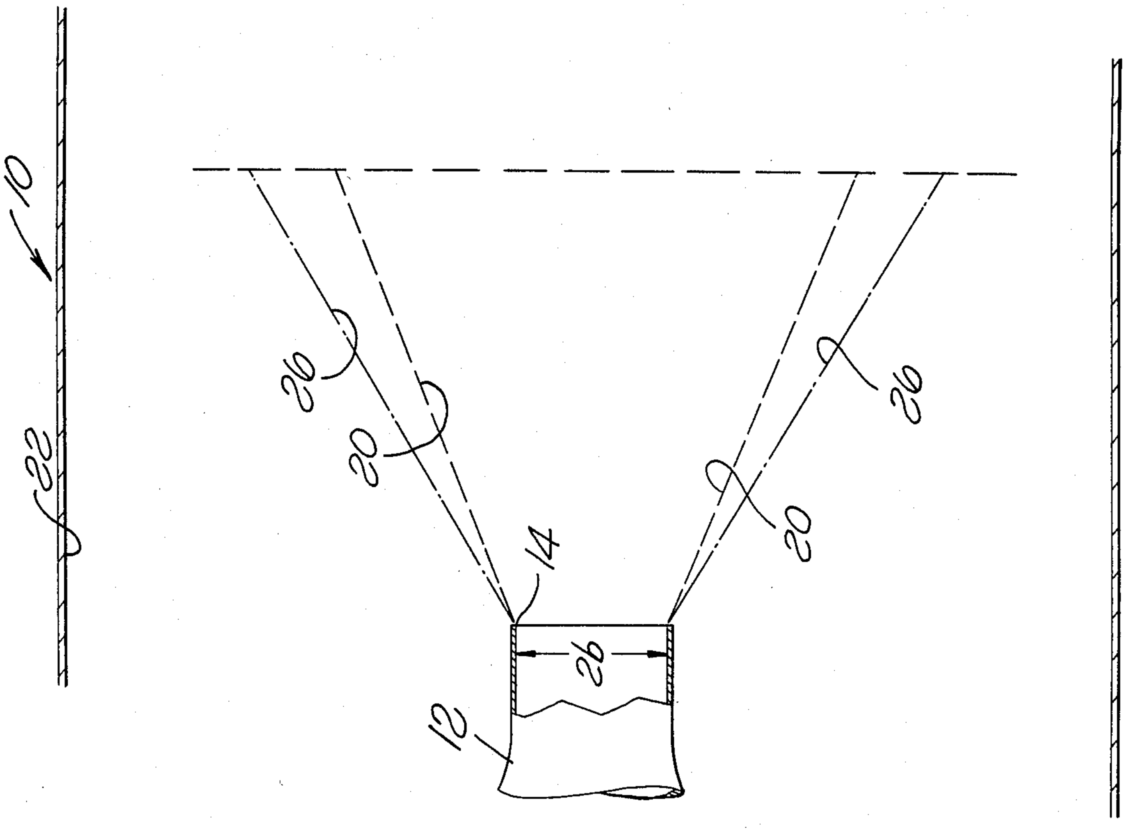
FIG. 1B is a top plan view of the apparatus of FIG. 1A.
Figure 1A:
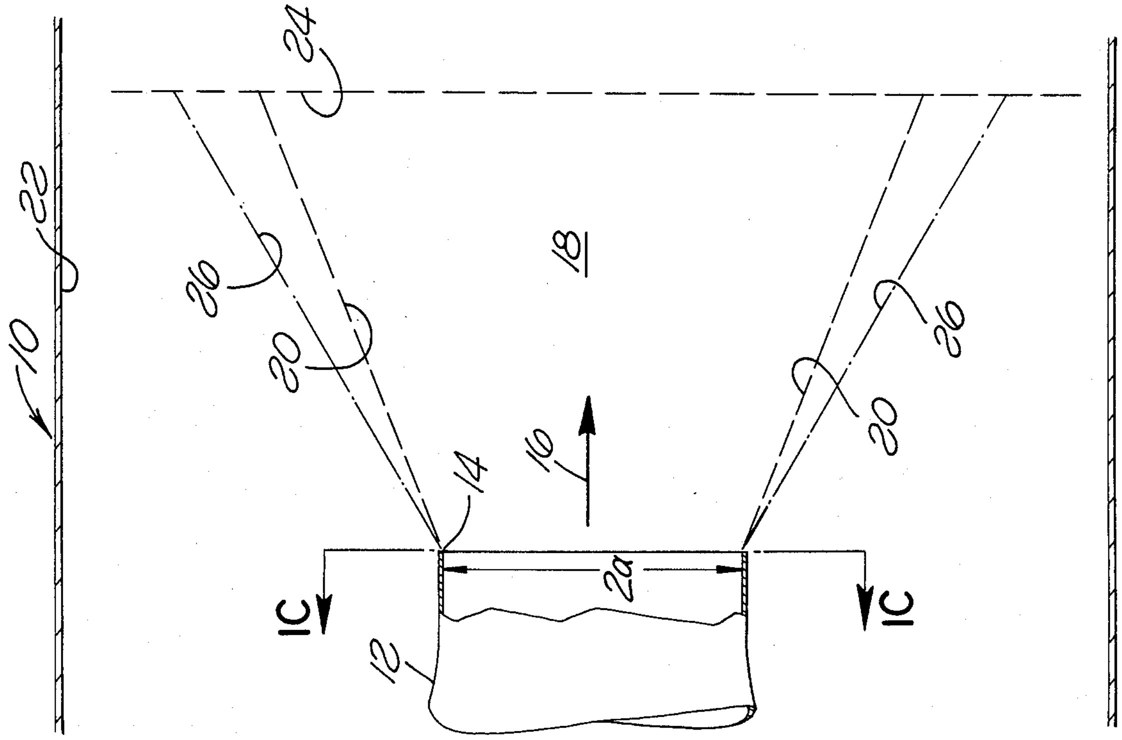
FIG. 1A is a diagrammatic side elevational view of a mixing apparatus constructed according to a preferred embodiment of the present invention.
Figure 1C:
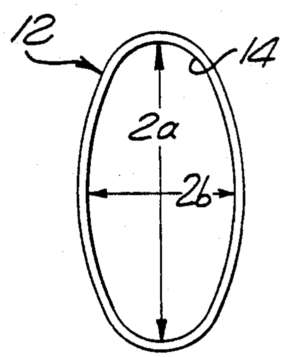
FIG. 1C is an end view of an elliptic orifice of the apparatus illustrated in FIG. 1A, taken in the direction 1C—1C.
Figure 1D:
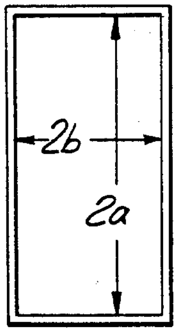
FIG. 1D is an end view of an alternate embodiment of the apparatus of FIG. 1A, wherein the orifice is rectangular in shape.
Figure 1E:
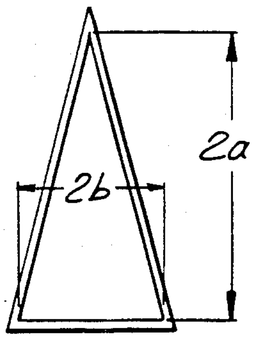
FIG. 1E is an end view of another alternate embodiment of the apparatus of FIG. 1A, wherein the orifice is triangular in shape.

Referring now to the drawings, FIGS. 1A, 1B, and 1C illustrate a mixing apparatus constructed according to a preferred embodiment of the present invention, generally designated 10. The apparatus 10 includes a fluid nozzle 12 which terminates in an orifice 14 having a major axis dimension equal to "2*a*" and a minor axis dimension equal to "2*b*", with the major and minor axes defined as discussed above. The orifice is preferably elliptical, as shown in FIG. 1C, but can also be rectangular, triangular, or of any other appropriately proportioned elongated shape. Specific cases of rectangular and triangular orifices are illustrated in FIGS. 1D and 1E, respectively.

The nozzle 12 emits a first fluid in a direction designated 16, to a mixing region 18 downstream of the orifice. The minimum lateral boundary of the mixing region, designated by the broken lines 20, represents the minimum space required to produce the unique mixing conditions of the present invention. A second fluid, which is at least partially the same phase as the first fluid, is introduced to the area of the jet by suitable fluid conductive means. In the FIGS. 1A and 1B, this fluid conductive means is illustrated as a broad chamber or conduit 22 which may be filled with the second fluid. The second fluid can flow with or against the jet, at an angle to the jet, or be stationary relative to it. Alternatively, the fluid may be introduced as a separate jet or by other suitable means, as long as it is sufficiently exposed to the jet emitted by the nozzle 12. In addition, the apparatus may include a suitable enclosing structure (not shown) located at or beyond the lateral boundary 20, as long as the structure does not interfere with introduction of the second fluid. The enclosing structure may define a closed mixing region, or may be open in the manner of a whirlpool bath.

A final constraint on the mixing region 18 is that it extends downstream a distance at least three times the minor axis diameter of the orifice. The downstream distance required to obtain the advantages of the invention is dependent primarily on the minor axis diameter of the orifice, and is equal to the distance within which the major and minor jet axes undergo a substantial portion of one switching transition. In the case of the orifice 14, the minimum downstream distance is equal to "6*b*", and is illustrated in the drawing by the broken line 24. This distance is necessary to permit sufficient spreading and induction of the jet. Although it is possible for the mixing region to extend downstream as far as desired, it is contemplated that the apparatus 10 will be most useful when the mixing region is less than approximately twenty times the minor axis dimension of the orifice. At any greater distance, the advantages of the apparatus 10 over those of the prior art would be substantially decreased.

The lateral boundary 20 delineates a mixing region having a lateral width of at least $2(a+0.4x)$ in a direction parallel to the major axis of the orifice 14, and a lateral width of at least $2(b+0.4x)$ in a direction parallel to the minor axis, where a and b are one-half the major and minor axis dimensions of the orifice, respectively, and x is the distance downstream of the orifice. This boundary represents a minimum which will be exceeded in many instances. An alternative minimum boundary 26, illustrated in phantom lines, would usually be preferable if size permits. The boundary 26 delineates a mixing region having a lateral width of at least $2(a+0.6x)$ in a direction parallel to the major axis of the orifice and a lateral width of at least $2(b+0.6x)$ in a direction parallel to the minor axis.

Figure 2A:
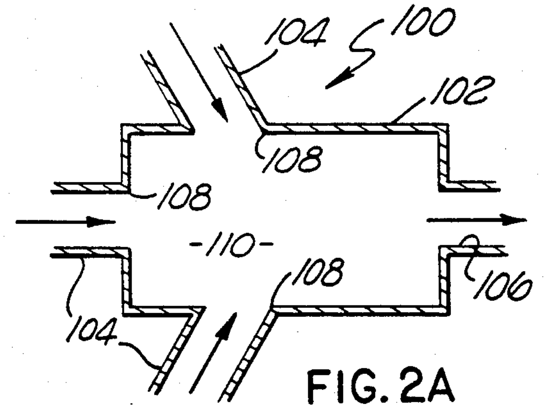
FIGS. 2A, 2B and 2C are additional alternate embodiments of the apparatus of the present invention.

Various specific embodiments using the concept of the apparatus 10 are illustrated, by way of example, in FIGS. 2A, 2B, 2C and 2D. In FIG. 2A, an apparatus 100 has a mixing chamber 102 with a plurality of inlets 104 and an outlet 106. The first fluid is introduced to the chamber along one or more of the inlets 104, the remainder of those inlets being used to introduce other fluids to be mixed with the first fluid. Although the number and angular orientations of the inlets will vary according to the application of the device, at least one of the inlets is provided with a nonaxisymmetric orifice 108 which is shaped and dimensioned according to the present invention. In addition, the mixing chamber provides a mixing area 110 of at least the minimum dimensions discussed herein, enabling vortex induction and vortex merging to enhance the mixing process. Fluid exits the chamber along the outlet 106.

Figure 2B:
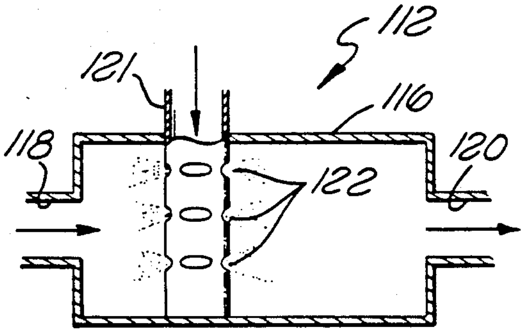
Figure 2C:
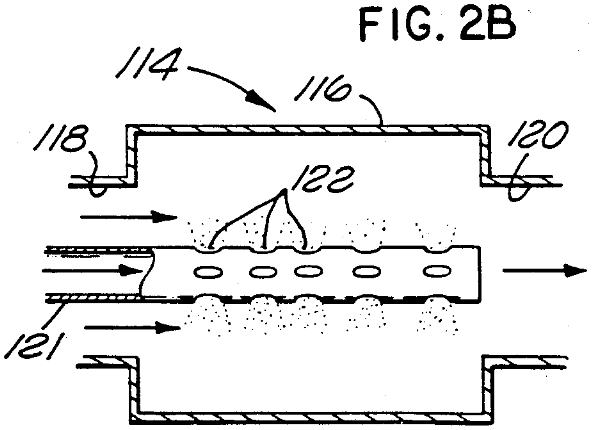

FIGS. 2B and 2C illustrate a pair of related apparatuses 112 and 114, each having a mixing chamber 116, at least one inlet 118 and an outlet 120. At least one of the fluids to be mixed is introduced along the inlet 118, while another fluid is introduced through an inlet pipe 121. The inlet pipe has a plurality of nonaxisymmetric openings 122 of small aspect ratio along its length, permitting the fluid within the pipe to be emitted into the chamber as a number of jets. When a sufficient mixing region is provided downstream of each opening 122, the fluid emitted by the openings is mixed into the surrounding fluid with the aid of vortex induction and vortex merging. The apparatus 114 differs from the apparatus 112 in that the pipe 121 of the apparatus 114 is directed across the flow from the inlet 118 to the outlet 120, while the pipe 121 of the apparatus 112 is directed along that flow.

The embodiments 100, 112 and 114 are representative of conventional mixing systems which have been adapted to the practice of the present invention by incorporating nonaxisymmetric openings of small aspect ratio and adequate downstream mixing regions. Such systems are useful, inter alia, in a variety of chemical reaction and combustion devices.

Figure 2D:
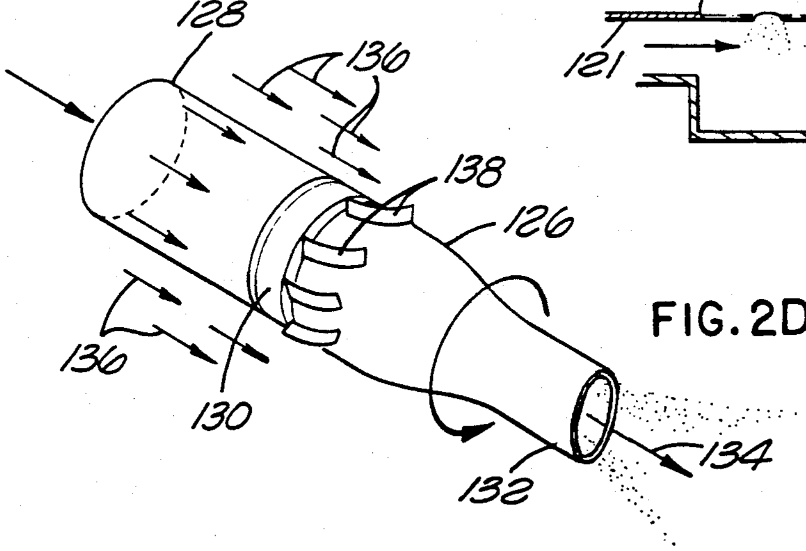
FIG. 2D illustrates a particular nozzle structure useful in a mixing apparatus constructed according to any of the various embodiments of the present invention.

FIG. 2D illustrates a variation of the nozzle structure of the present invention, generally designated 124. The structure 124 comprises a nozzle 126 rotatably coupled to one end of a conduit 128 by an annular bearing 130. The nozzle terminates in a nonaxisymmetric orifice 132 for emission of a jet 134 of a first fluid, and is rotated in the indicated direction by an external fluid flow 136 acting on a plurality of vanes 138. The orifice 132 may, of course, be any of the shapes and proportions discussed above for the orifice 14 of the apparatus 10. The nozzle therefore produces a nonaxisymmetric jet which rotates as it undergoes vortex induction, enhancing the turbulent entrainment and mixing processes of the present invention. The structure 124 is applicable to any system having an external fluid flow in the direction of the nozzle, and can be applied even to systems without such an external flow if other means are provided for rotating the nozzle.

Figure 3A:
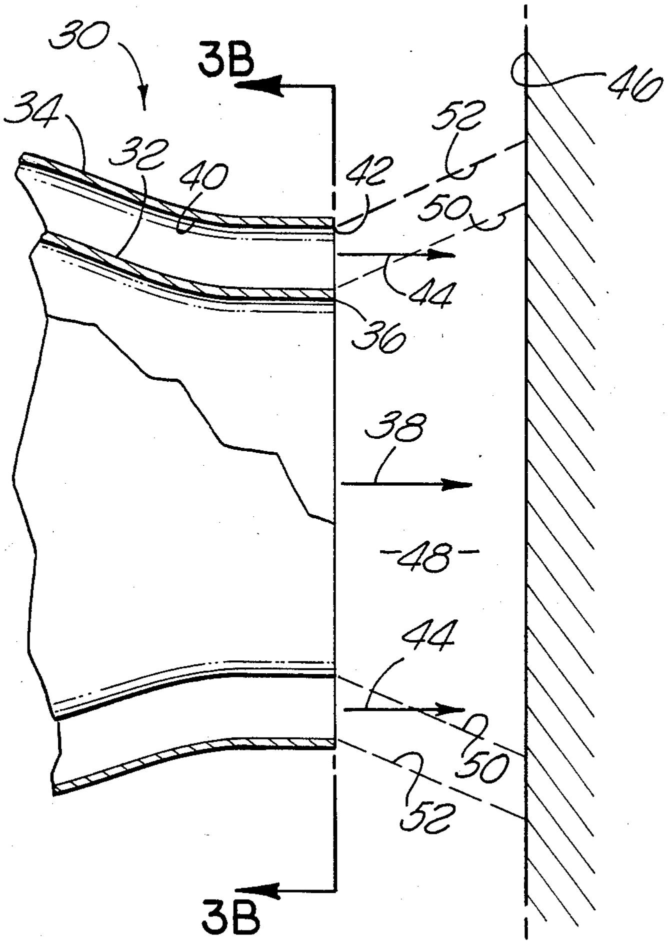
FIG. 3A is a diagrammatic side elevational view, partially broken away, of a mixing apparatus constructed according to a still further embodiment of the invention.
Figure 3B:
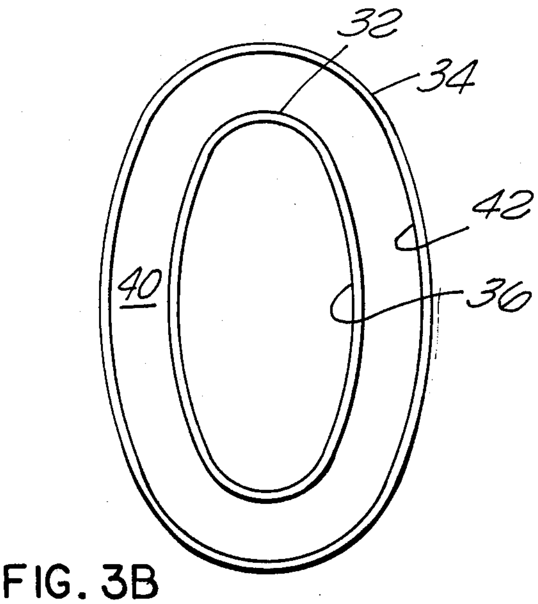
FIG. 3B is an end view of the coaxial elliptic orifice illustrated in FIG. 3A.

Another embodiment of the mixing apparatus, illustrated in FIGS. 3A and 3B, is generally designated 30. The apparatus 30 includes a pair of coaxial nozzles 32 and 34, with the inner nozzle 32 being similar in shape and dimensions to the nozzle 12 of the apparatus 10. Therefore, the nozzle 30 has an orifice 36 of elliptic, rectangular, triangular or other elongated shape, for emission of a jet of the first fluid in a direction 38. The elliptic case is specifically illustrated in FIG. 3B. The outer nozzle 34 defines an annular fluid passage 40 and terminates in an annular orifice 42 for emission of a second fluid, as shown at 44. The jets emitted by the two nozzles impinge upon a wall surface 46 located downstream of the orifices a distance at least equal to the minor axis dimension of the orifice 36. At the same time, a mixing region 48 between the orifice and the wall surface must be at least as great in lateral dimension as the mixing region 18 of the apparatus 10. The mixing region thus extends laterally at least to the minimum boundaries 50 between the orifice and the wall 46, permitting the vortex of the jet to evolve in the intended manner before striking the wall. In the preferred embodiment, the lateral width of the mixing region will be at least 2(a+0.4x) in a direction parallel to the major axis of the orifice 36 and at least 2(b+0.4) in a direction parallel to the minor axis of the orifice. A similar minimum boundary 52 is provided downstream of the annular orifice 42 for the same reason. The further downstream the wall surface 46 is located, the greater the extent of mixing before the jet impinges on the wall. However, the mixing achieved in the minimum distance is sufficient, in combination with impingement on the wall, to provide highly satisfactory results in many circumstances. The wall 46 may, of course, be perpendicular to the jet or at an angle to it, depending upon the practical application of the device. In addition, the nozzle may be rotated relative to the mixing region, as described in conjunction with FIG. 2D.

As discussed above, it is usually desirable that the orifice used to emit the jet does not diverge at an angle greater than approximately 7 degrees, the angle above which flows in the relevant range begins to "separate" from the adjacent surface. Thus, the orifices described above will usually have walls either parallel to the flow, converging toward the flow, or slightly diverging. An opening of the appropriate shape in a flat plate would also be suitable.

Figure 4A:
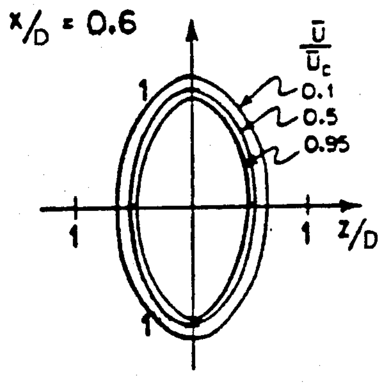
FIGS. 4A, 4B, and 4C are graphic representations of the mean velocity cross sections at three locations progressively downstream of the orifice of FIG. 1, demonstrating the switch of the major and minor axes of the jet.
Figure 4B:
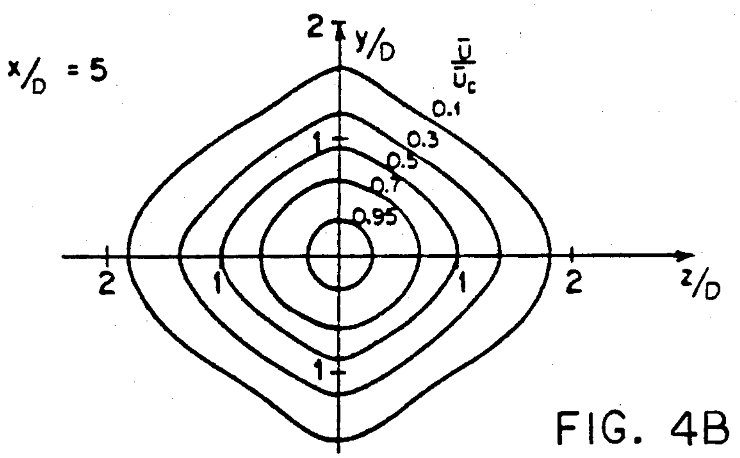
Figure 4C:
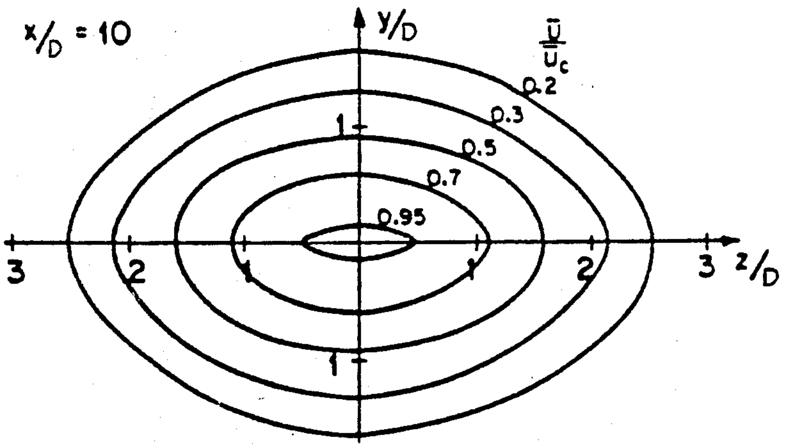
Figure 5:
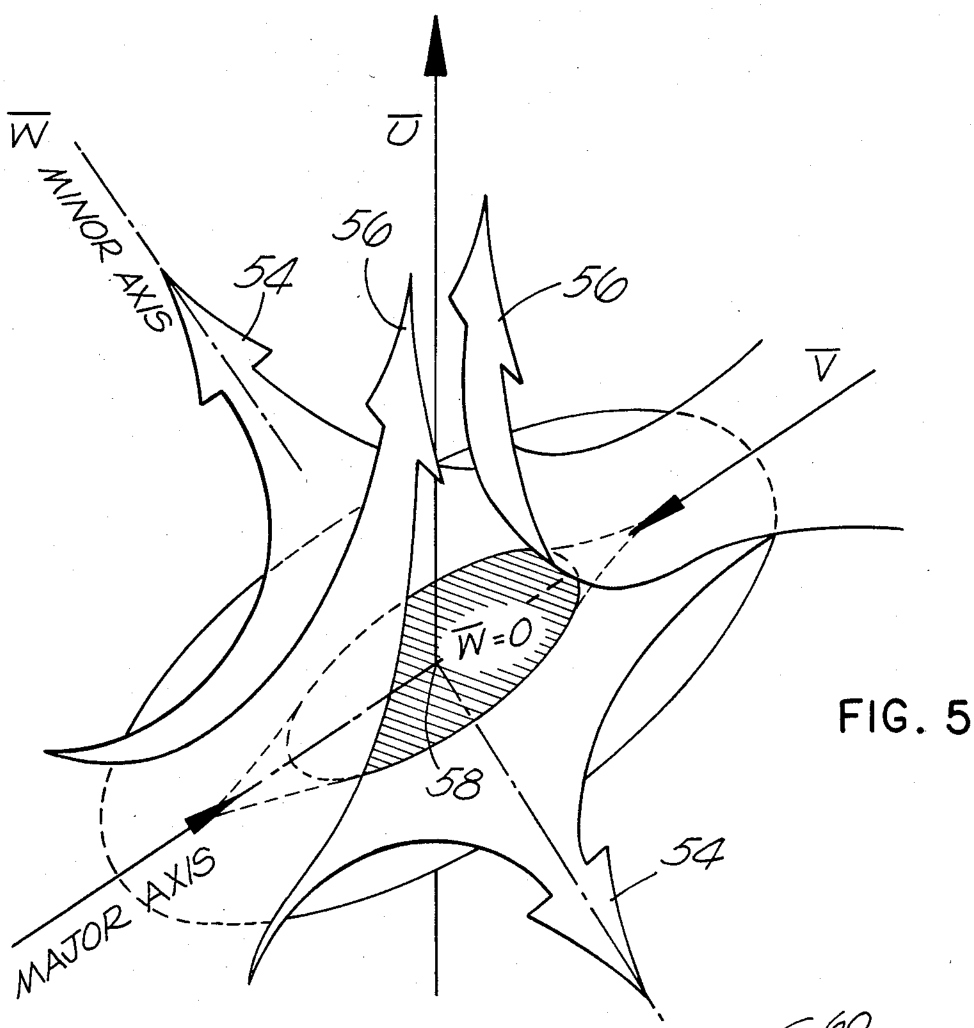
FIG. 5 is a conceptual sketch of the jet lateral mean flow at a location adjacent to the orifice.

In the case of an elliptic orifice, the manner in which the vortex of the jet evolves from its initial eccentric condition to a condition in which the major and minor axes are switched can be seen most clearly in FIGS. 4 and 5. FIGS. 4A, 4B and 4C are mean velocity cross sections across the jet at downstream locations equal to 0.6D, 5D and 10D, where "D" is the minor axis dimension of the orifice. In the cases illustrated in FIGS. 1 and 2, D=2b. The y and z axes shown in the figures are parallel to the major and minor axes of the orifice, respectively, and the curves shown are those along which the normalized axial velocity ($\overline{U}/\overline{U}_o$, where $\overline{U}$ is the mean axial velocity at a particular location and $\overline{U}_o$ is the mean exit velocity at the orifice) is constant. FIG. 4A illustrates the mean velocity profile at a relatively short distance (0.6D) downstream of the orifice. At that location, the shear layer is thin and the jet has substantially the outline of the orifice. At x=5D, as shown in FIG. 4B, the velocities along the two axes have reached substantially equal values, but the jet profile is still not axisymmetric. Rather, it has a predominant diamond shape, and the shear layer is increased substantially in thickness. Thus, the jet is no longer eccentric, but rather is at an intermediate stage in the switching or "induction" process. FIG. 4C shows the velocity profile at x=10D, where the axes of the jet are reversed and the elliptic shape is regained. The thickness of the shear layer is then even greater than in FIG. 4B. Beyond the point of FIG. 4C, the jet undergoes a similar switching transition until it regains a major axis parallel to that of the orifice. The switching continues until the nonuniform shear layer dissipates sufficiently to approximate an axisymmetric flow. This is believed to occur at a distance downstream of approximately 40D.

FIG. 5 illustrates the lateral mean flow conditions during the induction process. The lateral flow in the neighborhood of the minor axis of the jet is directed predominantly outward, as indicated at 54, whereas the flow near the major axis is directed somewhat inwardly, as indicated at 56. Although both components of the lateral mean velocity are low relative to the axial velocity, and do not reach more than approximately seven percent of its value, they are responsible for evolution of the jet through the stages illustrated in FIGS. 4A–4C. Some of the lateral flow drawn inwardly in the directions 56 is diverted toward the minor axis areas for inclusion in the outward flows 54. The lateral flow at the center 58 of the jet is equal to zero.

Figure 6A:
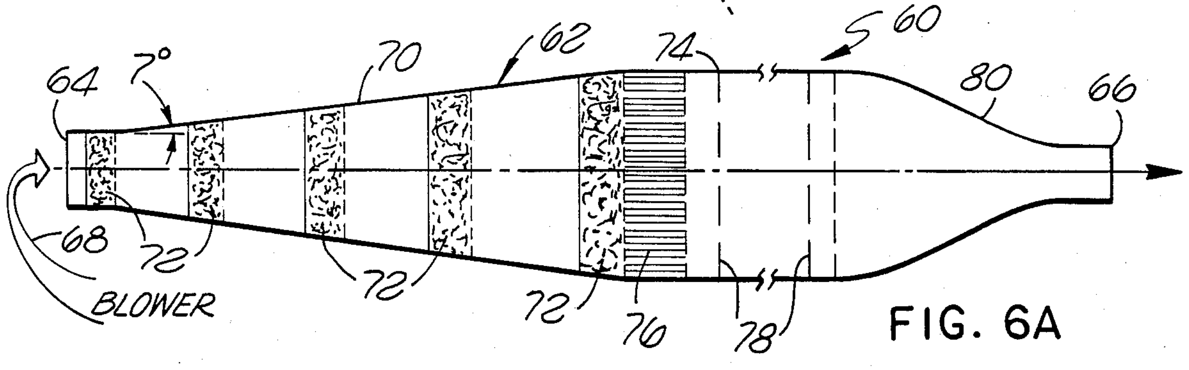
FIGS. 6A and 6B is a diagrammatic representation of an experimental apparatus used in the practice of the present invention.
Figure 6B:
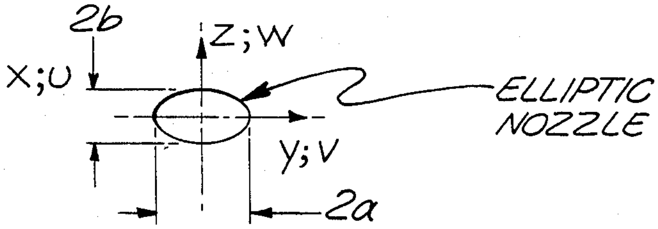

The principle described above, as well as the experimental data giving rise to FIGS. 4, 7, and 8, were determined by experimentation with an apparatus of the type shown at 60 in FIG. 6. The apparatus 60 comprises an aluminum housing 62 having an inlet 64 and an outlet 66. The outlet 66 corresponds to the orifice 14 of FIG. 1, and is elliptic in shape. Air is blown into the inlet 64, as indicated at 68, and passes through a small angle diffuser region 70 of the housing. The diffuser is 45.7 cm. in length and flares outwardly at an angle of 7 degrees, from a dimension of 6.3 cm. at the inlet 64 to a maximum dimension of 15.2 cm. This is accomplished over a distance of 45.7 cm., yielding a wide flow of air without causing the flow to separate from the walls of the housing. At the same time, the air passes through a number of foam rubber baffles 72 within the housing to minimize disturbances. From the widest portion of the diffuser region 70, the air flows to a stagnation region 74 having a uniform diameter of 15.2 cm. The stagnation chamber, shown in fragmented form in FIG. 6, is actually 40.6 cm. long and includes a honeycomb region 76 and a plurality of screens 78 to further minimize nonuniformities in the flow. Finally, the housing is reduced to the dimensions of the outlet 66 by a portion 80 whose surfaces are defined by fifth order polynomial profiles to produce a uniform jet of air. The outlet 66 is 50.8 mm. in the major axis dimension and 25.4 mm. in the minor axis dimension.

During the course of experimentation, a variety of mass flow rates, axial velocities and other parameters were tried. By way of example, a typical mass flow rate at the orifice 66 ($Q_o$) was 0.03 cubic meters per second at room temperature. The mean axial velocity at the orifice ($\overline{U}_o$) under these conditions was approximately 30 meters per second. Under these conditions, the various velocity components were measured by a pair of "hot wire" probes normal to each other and used in conjunction with a conventional electric circuit designed to keep the wires at a constant elevated temperature by resistive heating. The voltage required to keep the temperatures constant is related to the velocity of the fluid, and was processed by a digital computer. The pressure inside the jet was measured by a "pitot tube" probe, and the pressure fluctuations outside the jet were measured by small microphones. All data on the graphs of the drawing figures are shown in normalized units, for clarity.

Under the experimental conditions described above, at 3 cm. downstream from the orifice the flow rate (Q) was measured as 0.042 cubic meters per second, representing an increase of 40% in total mass flow over the original rate of 0.03 cubic meters per second. By comparison, the flow rate at the same distance downstream of an axisymmetric jet was 0.0314 cubic meters per second for the same initial flow rate. This represents a mass entrainment of only 4.9% over the original flow rate. Therefore, the elliptic jet of the apparatus 60 produced an eight-fold increase in entrainment at this location over that achieved with an axisymmetric jet.

Similar results at other distances downstream can be seen from the normalized values of FIG. 7, where $(Q/Q_o-1)$ represents the percentage increase in total mass flux relative to that through the orifice. The results achieved with the elliptic orifice 66, under the conditions described above, is represented by the line 82 of the graph, whereas the results with an axisymmetric jet are represented by the curve 84. As mentioned above, FIG. 8 shows that the greatest percentage increase in entrainment is achieved within a relatively short distance of the orifice 66. This is precisely the region in which it is desired, in many applications, to obtain optimum mixing. Size and other constraints usually prevent the use of larger mixing regions.

The importance of vortex induction to the results achieved with the apparatus of the present invention is evident from a comparison of entrainment contributions of the elliptic jet sections closest to the major and minor axes, respectively. As shown on the legend to FIG. 8, the jet section can be divided conceptually into opposing major and minor axis sections by a pair of perpendicular lines intersecting the y and z axes at angles of 45 degrees. The contribution to entrainment by the major axis sections are shown by markings 86 of the figure, and the minor axis contribution is defined by the curve 88. The major axis sections contribute to entrainment roughly to the same extent as the prior axisymmetric or two-dimensional jets. However, the minor axis sections have an extremely large contribution to entrainment, as seen by the curve 88. This effect on entrainment is believed to result, in part, from the outward direction of the lateral mean flow at the minor axis sections, which flow participates in induction of the vortex.

Additional data bearing out the conclusions discussed above is contained in FIGS. 7A and 7B representing the mean axial velocity profiles along the major and minor axis planes of the jet. Refering first to FIG. 7A, the initial velocity profile is shown at 90 as a rather abrupt curve. This represents the distribution of axial velocity at a distance of 0.05D downstream from the orifice. At greater and greater distances downstream, the axial velocity in the major axis plane decreases significantly, reaching the profile 92 at a distance of 12D downstream. However, the decrease of axial velocity within the area of the original jet is not accompanied by a substantial increase in the velocity outside that area. The situation in FIG. 7B is quite different. While the initial axial velocity profile, shown at 94, is similar to the profile 90 of the major axis plane, its transition in the downstream direction is much different. The first few succeeding profiles remain high in the area of the original jet, while increasing rapidly outside that area. The profile designated 96, for example, representing the condition at a distance of 3D downstream, shows a large increase in overall axial velocity in the minor axis plane.

The data of FIGS. 7A and 7B is therefore consistent with the vortex induction process. The flow at the minor axis spreads rapidly into the surrounding fluid, while the jet along the major axis does not spread as rapidly and, in fact, actually contracts somewhat at certain locations.

It will be understood that the jet flow produced in the apparatus of the present invention represents a substantially steady state condition, in that the shape of the jet is constant at each location downstream from the orifice. Thus, the fluid itself changes shape as it progresses along the jet, dispersing rapidly and entraining the adjacent fluid.

It will also be understood that, although the embodiments described herein involve jets with specific shapes, the jet of the present invention may, in fact, be any nonaxisymmetric (i.e., noncircular) shape with an "aspect ratio" less than five. Thus, any orifice having unequal major and minor axis dimensions related to each other by a factor of less than approximately five is believed to give rise to vortex induction under the conditions and in the apparatus discussed herein. Within this range, it is preferred that the ratio of the two dimensions be between approximately two and three. The orifice itself may be rectangular, triangular, diamond-shaped, or other elongated shape. An important point is that adequate mixing area be provided downstream of the orifice, either in the configuration of FIG. 1 or that of FIG. 3, to permit induction, merging, and dispersion of the vortex in the manner described herein. In addition, the wall-impinging case of FIGS. 3A and 3B is not limited to the embodiment shown, in which the second fluid is emitted from an orifice coaxial with the first orifice. Rather, the second fluid can be introduced to the downstream region in any other desired manner, as described above in relation to the embodiment of FIG. 1.

From the above, it can be seen that there has been provided an apparatus for greatly enhanced mixing of a first fluid jet with a second fluid, without the need for external forcing. A high level of entrainment and mixing is accomplished within a very short distance of the orifice, making the apparatus ideal for a wide variety of uses.

While certain specific embodiments of the invention have been disclosed as typical, the invention is of course not limited to these particular forms, but rather is applicable broadly to all such variations as fall within the scope of the appended claims. As an example, the apparatus is useful in virtually any process in which two fluids are to be mixed. The only requirement as to the fluids themselves is that they be at least partially of the same phase; i.e., that at least a portion of the second fluid be the same phase as a portion of the first fluid. Thus, the two fluids can be entirely of the same phase, or at least one of the fluids can be of the type commonly referred to as "two-phase". In some cases, the fluids may be the same in composition but different in temperature, as encountered in conventional heating baths.

What is claimed is:

1. Apparatus for mixing fluids, comprising:

first fluid conductive means terminating in at least one noncircular orifice for emitting a jet of a first fluid along a path in a preselected direction, the orifice having unequal major and minor axis dimensions with the major axis dimension being between two and three times the minor axis dimension;

means for providing a second fluid, which is at least partially of the same phase as the first fluid, at a location immediately downstream of the orifice for mixing with the first fluid; and means for defining a mixing region which extends downstream of the orifice a distance at least equal to the minor axis dimension, and which either;

terminates in a wall in the path of the jet; or continues downstream to a total distance from the orifice of at least three times the minor axis dimension;

the mixing region having a lateral width of at least 2(a+0.4x) in a direction parallel to the major axis and a lateral width of at least 2(b+0.4x) in a direction parallel to the minor axis, where a and b are one-half the major and minor axis dimensions, respectively, and x is the distance downstream of the orifice; and the orifice not diverging from the preselected direction by an angle of more than seven (7) degrees.

2. The apparatus of claim 1 wherein:

the first fluid conductive means is constructed and arranged to emit a substantially constant jet of the first fluid from the orifice.

3. The apparatus of claim 2 wherein:

the major and minor axis dimensions are measured in directions normal to each other.

4. The apparatus of claim 3 wherein:

the orifice is elliptic in shape.

5. The apparatus of claim 1 wherein:

said at least one noncircular orifice is rotatable relative to the mixing region to emit a rotating jet of the first fluid.

6. The apparatus of claim 1 wherein:

the mixing region has a lateral width of at least 2(a+0.6x) in a direction parallel to the major axis and a lateral width of at least 2(b+0.6x) in a direction parallel to the minor axis.

7. Apparatus for mixing fluids, comprising:

first fluid conductive means terminating in at least one noncircular orifice for emitting a jet of a first fluid along a path in a preselected direction, the orifice having unequal major and minor axis dimensions with the major axis dimension being less than five times the minor axis dimension;

means for providing a second fluid at a location immediately downstream of the orifice for mixing with the first fluid; and means for defining a mixing region extending downstream of the orifice a distance of at least three times the minor axis dimension, and having a lateral width of at least 2(a+0.4x) in a direction parallel to the major axis and a lateral width of at least 2(b+0.4x) in a direction parallel to the minor axis, where a and b are one-half the major and minor axis dimensions, respectively, and x is the distance downstream of the orifice.

8. The apparatus of claim 7 wherein:

the orifice does not diverge from the preselected direction by an acute angle of more than seven (7) degrees.

9. The apparatus of claim 8 wherein:

the first fluid conductive means is constructed and arranged to emit a substantially constant jet of the first fluid from the orifice.

10. The apparatus of claim 9 wherein:

the orifice is elliptic in shape.

11. The apparatus of claim 10 wherein:

the major axis dimension of the orifice is between two and three times the minor axis dimension.

12. The apparatus of claim 11 wherein:

the mixing region has a lateral width of at least 2(a+0.6x) in a direction parallel to the major axis and a lateral width of at least 2(b+0.6x) in a direction parallel to the minor axis.

13. The apparatus of claim 11 wherein the mixing region extends downstream of the orifice a distance of at least five times the minor axis dimension.

14. The apparatus of claim 7 wherein:

the means for defining a mixing region comprises a mixing chamber; and the means for providing a second fluid comprises at least one inlet to the mixing chamber.

15. The apparatus of claim 14 wherein:

said at least one inlet terminates in a noncircular orifice having unequal major and minor axis dimensions, the major axis dimension being less than five times the minor axis dimension.

16. The apparatus of claim 14 wherein:

the first fluid conductive means comprises a conduit extending a preselected distance into the mixing region and having a plurality of said noncircular orifices along the length thereof for emission of a plurality of jets of the first fluid into the mixing region.

17. The apparatus of claim 16 wherein:

the conduit is substantially tubular in shape.

18. Apparatus for mixing fluids, comprising:

first fluid conductive means terminating in at least one noncircular orifice for emitting a jet of a first fluid along a path in a preselected direction, the orifice having unequal major and minor axis dimensions with the major axis dimension being less than five times the minor axis dimension;

means for providing a second fluid at a location immediately downstream of the orifice for mixing with the first fluid; and wall means in the path of the jet and substantially perpendicular to said preselected direction, the wall means being downstream of the orifice a distance at least equal to the minor axis dimension;

the orifice not diverging from the preselected direction by an acute angle of more than seven (7) degrees.

19. The apparatus of claim 18 wherein:

the orifice is elliptic in shape.

20. The apparatus of claim 19 wherein:

the major axis dimension of the orifice is between two and three times the minor axis dimension.

21. The apparatus of claim 20 wherein:

the mixing region has a lateral width of at least 2(a+0.6x) in a direction parallel to the major axis and a lateral width of at least 2(b+0.6x) in a direction parallel to the minor axis.

22. The apparatus of claim 18 wherein:

the means for providing a second fluid comprises a second fluid conduit substantially coaxial with the first fluid conduit and terminating in a second orifice adjacent to said noncircular orifice.

23. The apparatus of claim 22 wherein:

said at least one noncircular orifice and the second orifice are elliptic in shape; and the second orifice has major and minor axis dimensions proportioned similarly to the major and minor axis dimensions of said at least one noncircular orifice.

* * * * *